(12) United States Patent
Joseph et al.

(10) Patent No.: US 11,202,222 B2
(45) Date of Patent: Dec. 14, 2021

(54) QUALITY OF SERVICE MAPPING FOR TIME-SENSITIVE NETWORK TRAFFIC IN A WIRELESS COMMUNICATION SYSTEM

(71) Applicant: QUALCOMM Incorporated, San Diego, CA (US)

(72) Inventors: Vinay Joseph, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 16/660,176

(22) Filed: Oct. 22, 2019

(65) Prior Publication Data
US 2020/0137615 A1  Apr. 30, 2020

Related U.S. Application Data

(60) Provisional application No. 62/750,033, filed on Oct. 24, 2018.

(51) Int. Cl.
*H04W 28/02* (2009.01)
*H04W 56/00* (2009.01)
(Continued)

(52) U.S. Cl.
CPC ....... *H04W 28/0268* (2013.01); *H04W 8/245* (2013.01); *H04W 28/0257* (2013.01);
(Continued)

(58) Field of Classification Search
CPC ......... H04W 28/0268; H04W 28/0215; H04W 28/24; H04W 28/0231; H04W 28/0257;
(Continued)

(56) References Cited

U.S. PATENT DOCUMENTS 10,511,455 B1 * 12/2019 Sharma ................ H04L 47/283
2020/0389405 A1 * 12/2020 Mardmoeller .......... H04L 47/56
(Continued)

OTHER PUBLICATIONS 802.11 QoS Overview , Nov. 2008 (Year: 2008).*
(Continued)

*Primary Examiner* — Jae Y Lee
*Assistant Examiner* — Aixa A Guadalupe Cruz
(74) *Attorney, Agent, or Firm* — Harrity & Harrity, LLP

(57) ABSTRACT

Various aspects of the present disclosure generally relate to wireless communication. In some aspects, a network controller of a wireless communication system may receive a time-sensitive network (TSN) traffic configuration that indicates a duration of a gate open state for a TSN traffic flow and a periodicity with which the gate open state occurs; configure one or more quality of service (QoS) parameters, associated with the wireless communication system, for a QoS flow that is to carry the TSN traffic flow, wherein the one or more QoS parameters are configured based at least in part on one or more TSN capability parameters associated with the network controller and at least one of the duration of the gate open state or the periodicity; and transmit the one or more QoS parameters to a base station of the wireless communication system. Numerous other aspects are provided.

30 Claims, 9 Drawing Sheets

(51) Int. Cl.
    *H04W 8/24* (2009.01)
    *H04W 48/06* (2009.01)
    *H04L 12/857* (2013.01)
    *H04L 12/927* (2013.01)
(52) U.S. Cl.
    CPC ......... *H04W 48/06* (2013.01); *H04W 56/001* (2013.01); *H04L 47/2491* (2013.01); *H04L 47/805* (2013.01)
(58) Field of Classification Search
    CPC .... H04W 48/02; H04L 47/283; H04L 47/805; Y02D 30/00
    See application file for complete search history.

(56) References Cited

U.S. PATENT DOCUMENTS

2021/0007160 A1* 1/2021 Sivasiva Ganesan ........................ H04W 48/16
2021/0022154 A1* 1/2021 Cavalcanti .......... H04W 72/005

OTHER PUBLICATIONS

The Time-Sensitive Networking Task Group of IEEE, "Amendment: Stream Reservation Protocol (SRP) Enhancements and Performance Improvements," Mar. 6, 2018, 214pgs.
The Maintenance Task Group of IEEE, "Bridges and Bridged Networks," Feb. 17, 2018, 2000pgs.
Brown G., "Ultra-Reliable Low-Latency 5g for Industrial Automation", Heaving Reading White Paper (https://www.qualcomm.com/media/documents/files/read-the-white-paper-by-heavy-reading.pdf), Qualcomm Inc, CN, Jun. 8, 2018 (Jun. 8, 2018), pp. 1-11, XP009517533, Retrieved from the Internet: URL:https://pdfs.semanticscholar.org/3998/75e0d9f9fd523b5c248730adf6ac65619a20.pdf [retrieved on Dec. 3, 2019], p. 7-p. 8; figure 5.
International Search Report and Written Opinion—PCT/US2019/057565—ISA/EPO—dated Dec. 12, 2019.
Nokia et al., "Integration of the 5G System in a TSN Network", 3GPP Draft; S2-188459—Architecture For TSN Integration With 5G-V3, 3rd Generation Partnership Project (3GPP), Mobile Competence Centre ; 650, Route Des Lucioles ; F-06921 Sophia-Antipolis Cedex ; Fran, vol. SA WG2, No. Sophia Antipolis; Aug. 20-24, 2018, Aug. 26, 2018 (Aug. 26, 2018), XP051537344, 6 Pages.
Zha Y et al., "Deterministic Networking Flow Information Model; draft-zha-detnet-flow-info-model-02.txt", Deterministic Networking Flow Information Model; Draft-ZHA-DETNET-FLOW-INFO-MODEL-02.TXT, Internet Engineering Task Force, IETF; Standardworkingdraft, Internet Society (ISOC) 4, Rue Des Falaises CH—1205 Geneva, Switzerland, Mar. 13, 2017 (Mar. 13, 2017), pp. 1-15, XP015118602, [retrieved on Mar. 13, 2017], p. 11-p. 12.

* cited by examiner

QUALITY OF SERVICE MAPPING FOR TIME-SENSITIVE NETWORK TRAFFIC IN A WIRELESS COMMUNICATION SYSTEM

CROSS-REFERENCE TO RELATED APPLICATION

This application claims priority to U.S. Provisional Patent Application No. 62/750,033, filed on Oct. 24, 2018, entitled "QUALITY OF SERVICE MAPPING FOR TIME-SENSITIVE NETWORK TRAFFIC IN A WIRELESS COMMUNICATION SYSTEM," which is hereby expressly incorporated by reference herein.

FIELD OF THE DISCLOSURE

Aspects of the present disclosure generally relate to wireless communication and to techniques and apparatuses for quality of service mapping for time-sensitive network traffic in a wireless communication system.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a network controller of a wireless communication system, may include receiving a time-sensitive network (TSN) traffic configuration that indicates a duration of a gate open state for a TSN traffic flow and a periodicity with which the gate open state occurs; configuring one or more quality of service (QoS) parameters, associated with the wireless communication system, for a QoS flow that is to carry the TSN traffic flow, wherein the one or more QoS parameters are configured based at least in part on one or more TSN capability parameters associated with the network controller and at least one of the duration of the gate open state or the periodicity; and transmitting the one or more QoS parameters to a base station of the wireless communication system.

In some aspects, a network controller of a wireless communication system may include memory and one or more processors coupled to the memory. The memory and the one or more processors may be configured to receive a time-sensitive network (TSN) traffic configuration that indicates a duration of a gate open state for a TSN traffic flow and a periodicity with which the gate open state occurs; configure one or more quality of service (QoS) parameters, associated with the wireless communication system, for a QoS flow that is to carry the TSN traffic flow, wherein the one or more QoS parameters are configured based at least in part on one or more TSN capability parameters associated with the network controller and at least one of the duration of the gate open state or the periodicity; and transmit the one or more QoS parameters to a base station of the wireless communication system.

In some aspects, a non-transitory computer-readable medium may store one or more instructions for wireless communication. The one or more instructions, when executed by one or more processors of a network controller of a wireless communication system, may cause the one or more processors to receive a time-sensitive network (TSN) traffic configuration that indicates a duration of a gate open state for a TSN traffic flow and a periodicity with which the gate open state occurs; configure one or more quality of service (QoS) parameters, associated with the wireless communication system, for a QoS flow that is to carry the TSN traffic flow, wherein the one or more QoS parameters are configured based at least in part on one or more TSN capability parameters associated with the network controller and at least one of the duration of the gate open state or the periodicity; and transmit the one or more QoS parameters to a base station of the wireless communication system.

In some aspects, an apparatus of a wireless communication system may include means for receiving a time-sensitive network (TSN) traffic configuration that indicates a duration of a gate open state for a TSN traffic flow and a periodicity with which the gate open state occurs; means for configuring one or more quality of service (QoS) parameters, associated with the wireless communication system, for a QoS flow that is to carry the TSN traffic flow, wherein the one or more QoS parameters are configured based at least in part on one or more TSN capability parameters associated with the apparatus and at least one of the duration of the gate open state or the periodicity; and means for transmitting the one or more QoS parameters to a base station of the wireless communication system.

In some aspects, a method of wireless communication, performed by a base station of a wireless communication system, may include receiving an indication of one or more quality of service (QoS) parameters, associated with the wireless communication system, for a QoS flow that is to carry a time-sensitive network (TSN) traffic flow, wherein the one or more QoS parameters are based at least in part on one or more TSN capability parameters and at least one of a duration of a gate open state for the TSN traffic flow or a periodicity with which the gate open state occurs; and processing the TSN traffic flow based at least in part on the one or more QoS parameters.

In some aspects, a base station of a wireless communication system may include memory and one or more processors coupled to the memory. The memory and the one or more processors may be configured to receive an indication of one or more quality of service (QoS) parameters, associated with the wireless communication system, for a QoS flow that is to carry a time-sensitive network (TSN) traffic flow, wherein the one or more QoS parameters are based at least in part on one or more TSN capability parameters and at least one of a duration of a gate open state for the TSN traffic flow or a periodicity with which the gate open state occurs; and process the TSN traffic flow based at least in part on the one or more QoS parameters.

In some aspects, a non-transitory computer-readable medium may store one or more instructions for wireless communication. The one or more instructions, when executed by one or more processors of a base station of a wireless communication system, may cause the one or more processors to receive an indication of one or more quality of service (QoS) parameters, associated with the wireless communication system, for a QoS flow that is to carry a time-sensitive network (TSN) traffic flow, wherein the one or more QoS parameters are based at least in part on one or more TSN capability parameters and at least one of a duration of a gate open state for the TSN traffic flow or a periodicity with which the gate open state occurs; and process the TSN traffic flow based at least in part on the one or more QoS parameters.

In some aspects, an apparatus of a wireless communication system may include means for receiving an indication of one or more quality of service (QoS) parameters, associated with the wireless communication system, for a QoS flow that is to carry a time-sensitive network (TSN) traffic flow, wherein the one or more QoS parameters are based at least in part on one or more TSN capability parameters and at least one of a duration of a gate open state for the TSN traffic flow or a periodicity with which the gate open state occurs; and means for processing the TSN traffic flow based at least in part on the one or more QoS parameters.

Aspects generally include a method, apparatus, system, computer program product, non-transitory computer-readable medium, user equipment, base station, network controller, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
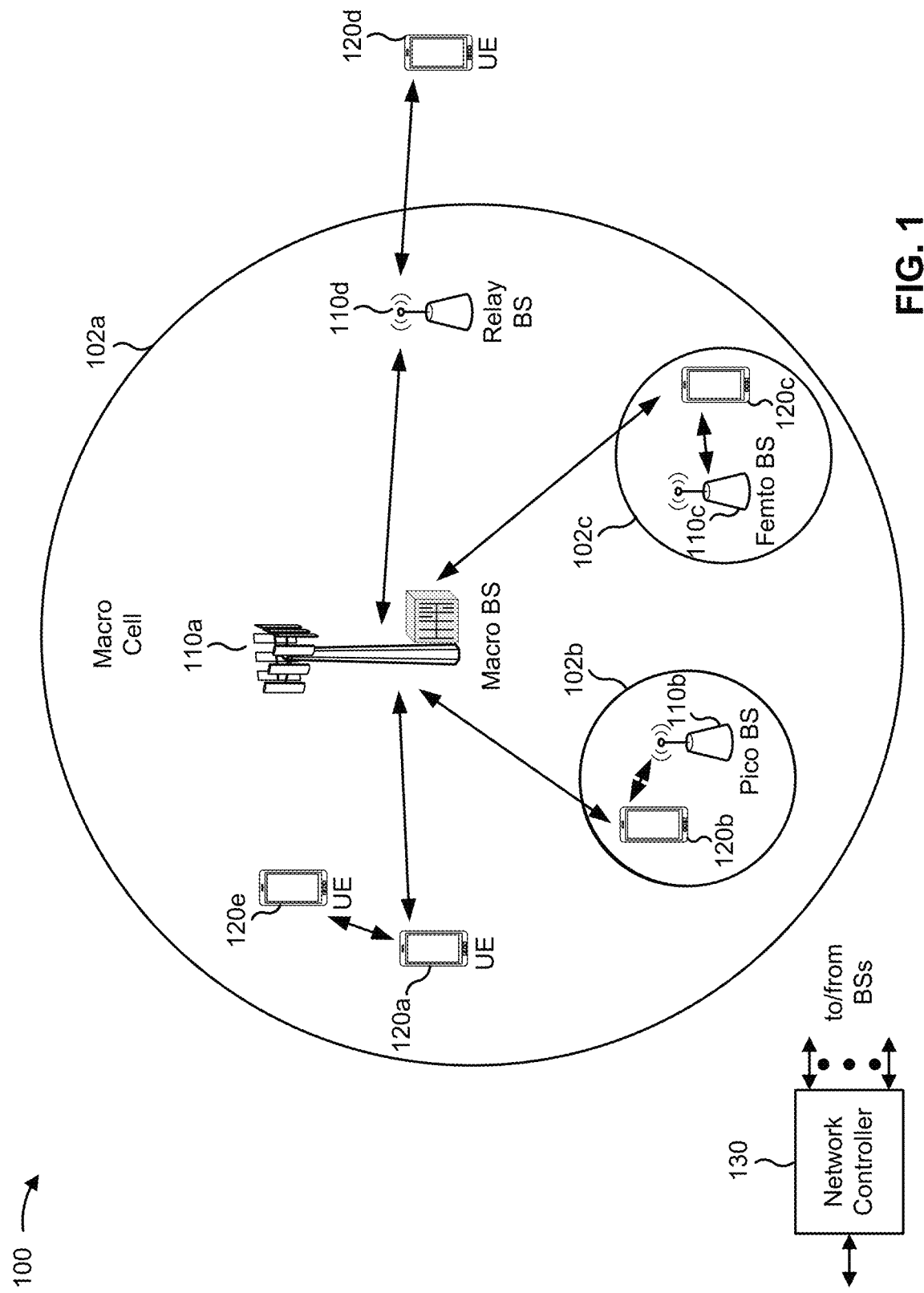
FIG. 1 is a block diagram illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
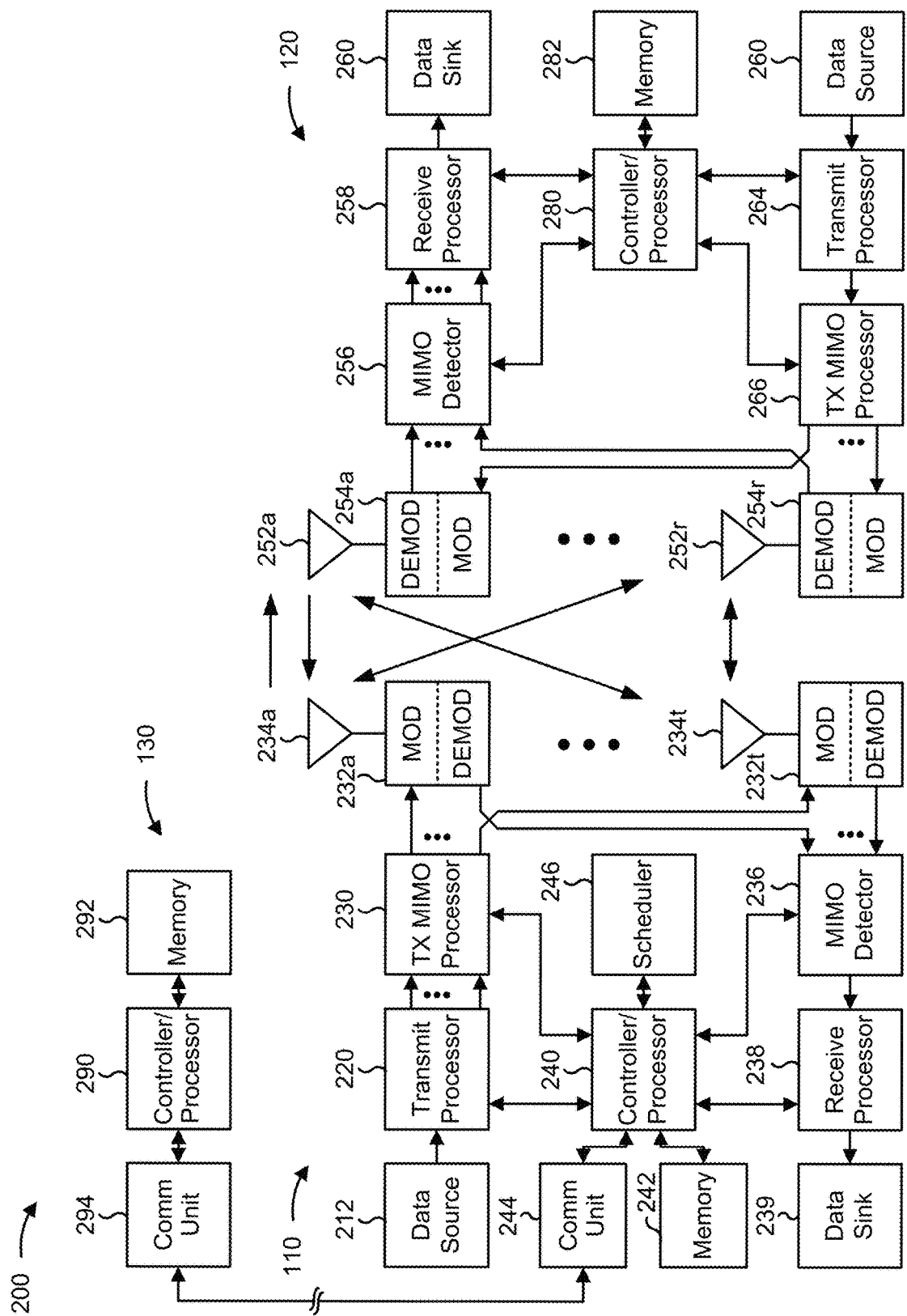
FIG. 2 is a block diagram illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, controller/processor 290 of network controller 130, and/or any other component(s) of FIG. 2 may perform one or more techniques associated with quality of service mapping for time-sensitive network traffic in a wireless communication system, as described in more detail elsewhere herein. For example, controller/processor 240 of base station 110, controller/processor 280 of UE 120, controller/processor 290 of network controller 130, and/or any other component(s) of FIG. 2 may perform or direct operations of, for example, process 800 of FIG. 8, process 900 of FIG. 9, and/or other processes as described herein. Memories 242, 282, and 292 may store data and program codes for base station 110, UE 120, and network controller 130, respectively. A scheduler 246 may schedule UEs for data transmission on the downlink and/or uplink.

In some aspects, network controller 130 may include means for receiving a time-sensitive network (TSN) traffic configuration that indicates a duration of a gate open state for a TSN traffic flow and a periodicity with which the gate open state occurs; means for configuring one or more quality of service (QoS) parameters, associated with the wireless communication system, for a QoS flow that is to carry the TSN traffic flow, wherein the one or more QoS parameters are configured based at least in part on one or more TSN capability parameters associated with network controller 130 and at least one of the duration of the gate open state or the periodicity; means for transmitting the one or more QoS parameters to a base station of the wireless communication system; and/or the like. In some aspects, one or more TSN capability parameters associated with a network controller 130 may be associated with the wireless communication system. As a result, the one or more TSN capability parameters may depend on one or more capabilities of the wireless communication system. For example, different wireless communications systems using the network controller 130 may have different TSN capability parameters depending on various parameters, such as supported subcarrier spacings, bandwidth, quality of backhauls, and/or the like. In some aspects, such means may include one or more components of network controller 130 described in connection with FIG. 2.

In some aspects, base station 110 may include means for receiving an indication of one or more quality of service (QoS) parameters, associated with the wireless communication system, for a QoS flow that is to carry a time-sensitive network (TSN) traffic flow, wherein the one or more QoS parameters are based at least in part on one or more TSN capability parameters and at least one of a duration of a gate open state for the TSN traffic flow or a periodicity with which the gate open state occurs; means for processing the TSN traffic flow based at least in part on the one or more QoS parameters; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3:
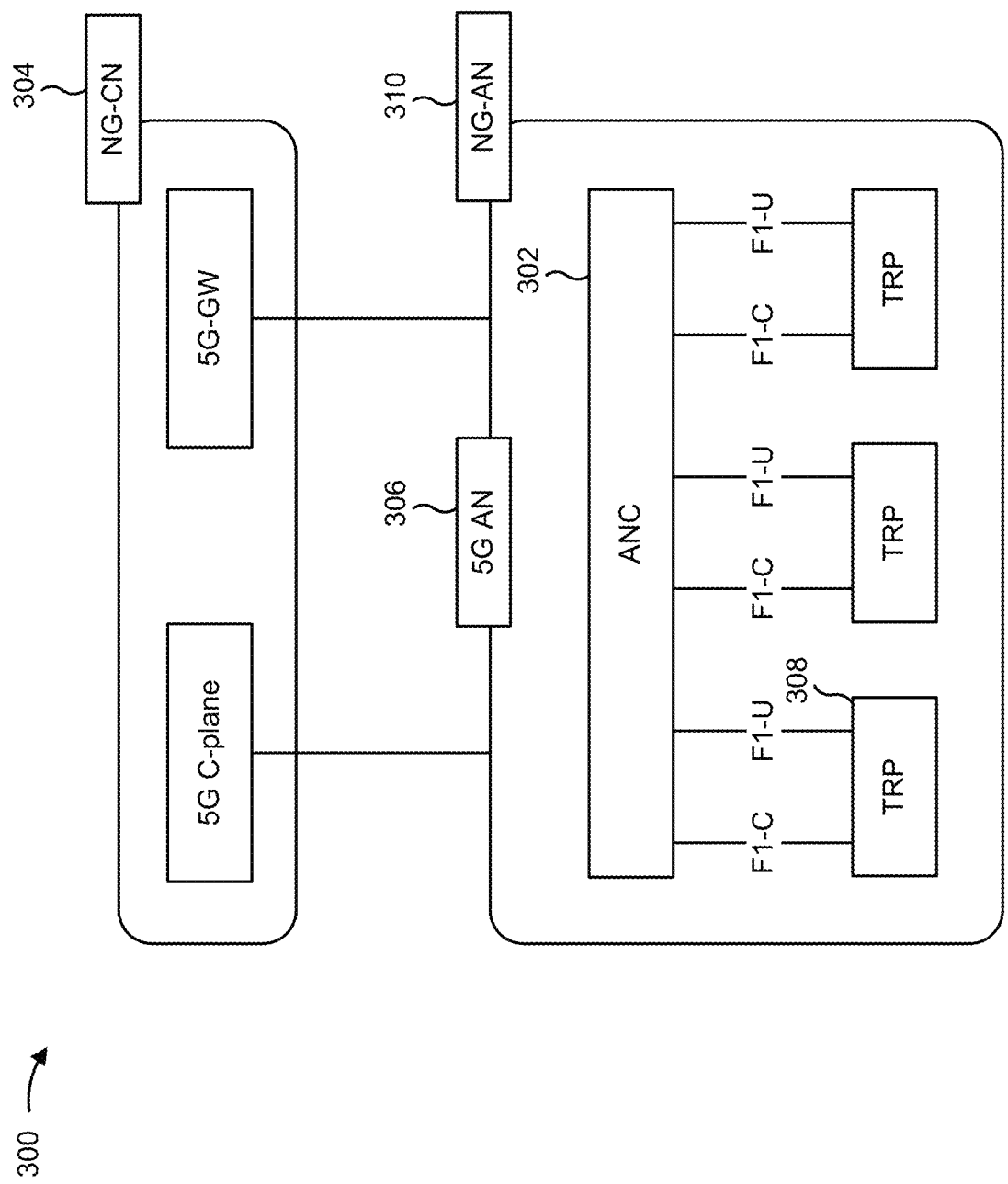
FIG. 3 illustrates an example logical architecture of a distributed radio access network (RAN), in accordance with various aspects of the present disclosure.

FIG. 3 illustrates an example logical architecture of a distributed RAN 300, according to aspects of the present disclosure.

A 5G access node 306 may include an access node controller (ANC) 302. The ANC 302 may be a central unit (CU) of the distributed RAN 300. The backhaul interface to the next generation core network (NG-CN) 304 may terminate at the ANC 302. The backhaul interface to neighboring next generation access nodes (NG-ANs) may terminate at the ANC 302. The ANC 302 may include one or more TRPs 308 (which may also be referred to as BSs, NR BSs, Node Bs, 5G NBs, APs, gNB, or some other term). As described above, a TRP 308 may be used interchangeably with "cell." In some aspects, multiple TRPs 308 may be included in a single base station 110. Additionally, or alternatively, different TRPs 308 may be included in different base stations 110. In some aspects, network controller 130 may include ANC 302.

A TRP 308 may be a distributed unit (DU). A TRP 308 may be connected to a single ANC 302 or multiple ANCs 302. For example, for RAN sharing, radio as a service (RaaS), and service specific AND deployments, the TRP 308 may be connected to more than one ANC 302. A TRP 308 may include one or more antenna ports. The TRPs 308 may be configured to individually (e.g., using dynamic selection) or jointly (e.g., using joint transmission) serve traffic to a UE 120.

The local architecture of RAN 300 may be used to illustrate fronthaul definition. The architecture may be defined to support fronthauling solutions across different deployment types. For example, the architecture may be based at least in part on transmit network capabilities (e.g., bandwidth, latency, and/or jitter). The architecture may share features and/or components with LTE. According to aspects, the next generation AN (NG-AN) 310 may support dual connectivity with NR. The NG-AN 310 may share a common fronthaul for LTE and NR. The architecture may enable cooperation between and among TRPs 308. For example, cooperation may be preset within a TRP 308 and/or across TRPs 308 via the ANC 302. In some aspects, no inter-TRP interface may be needed/present.

In some aspects, a dynamic configuration of split logical functions may be present within the architecture of RAN 300. The packet data convergence protocol (PDCP), radio link control (RLC), media access control (MAC) protocol, and/or the like may be adaptably placed at the ANC 302 or TRP 308. According to various aspects, a base station 110 may include a central unit (CU) (e.g., ANC 302) and/or one or more distributed units (e.g., one or more TRPs 308).

As indicated above, FIG. 3 is provided merely as an example. Other examples are possible and may differ from what was described with regard to FIG. 3.

Figure 4:
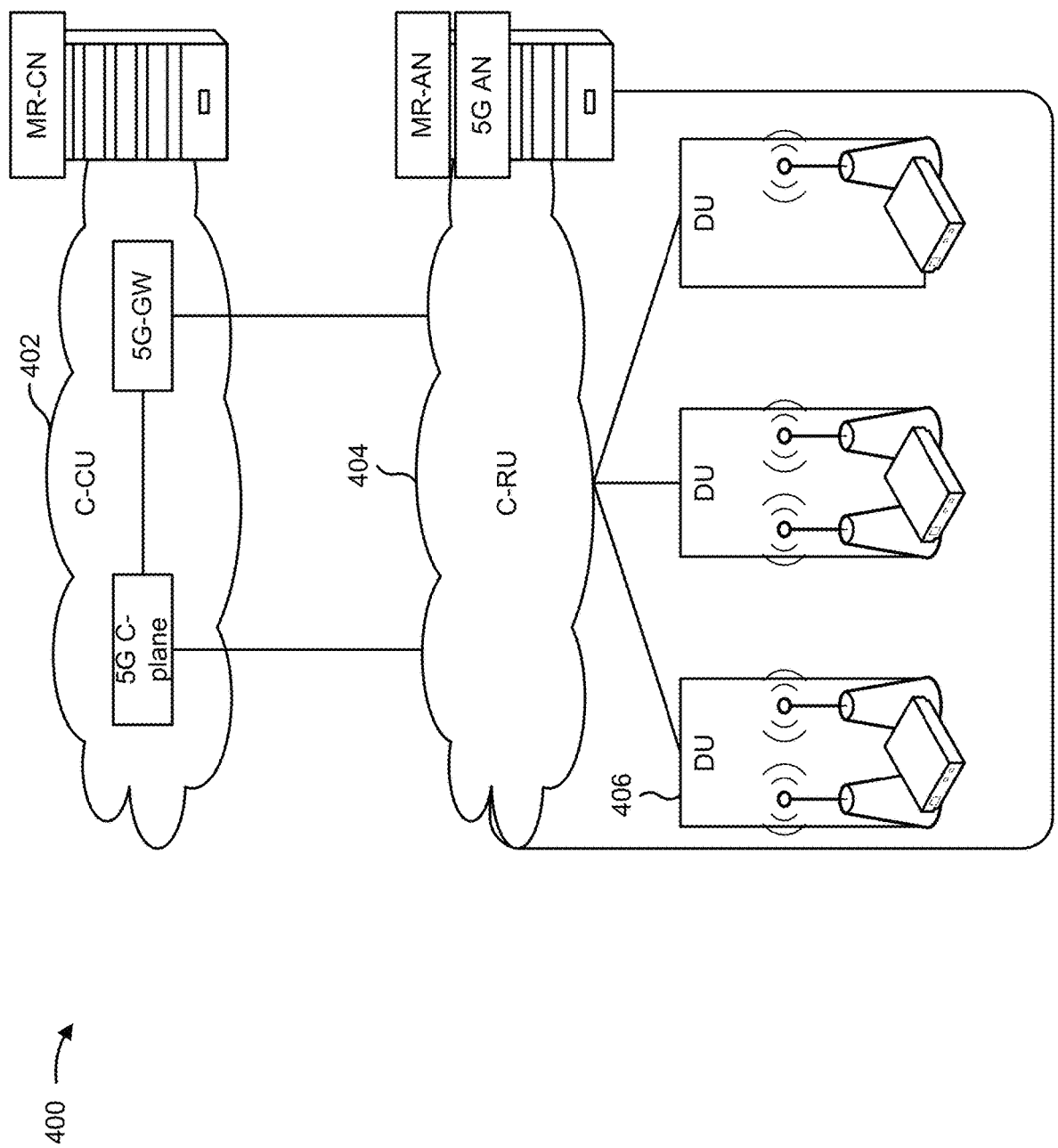
FIG. 4 illustrates an example physical architecture of a distributed RAN, in accordance with various aspects of the present disclosure.

FIG. 4 illustrates an example physical architecture of a distributed RAN 400, according to aspects of the present disclosure.

A centralized core network unit (C-CU) 402 may host core network functions. The C-CU 402 may be centrally deployed. Functionality of the C-CU 402 may be offloaded (e.g., to advanced wireless services (AWS)), in an effort to handle peak capacity. A centralized RAN unit (C-RU) 404 may host one or more ANC functions. In some aspects, the C-RU 404 may host core network functions locally. In some aspects, the C-RU 404 may have distributed deployment. A distributed unit (DU) 406 may host one or more TRPs 308. The DU 406 may be located at edges of the network with radio frequency (RF) functionality. In some aspects, network controller 130 may include C-CU 402.

As indicated above, FIG. 4 is provided merely as an example. Other examples are possible and may differ from what was described with regard to FIG. 4.

Figure 5:
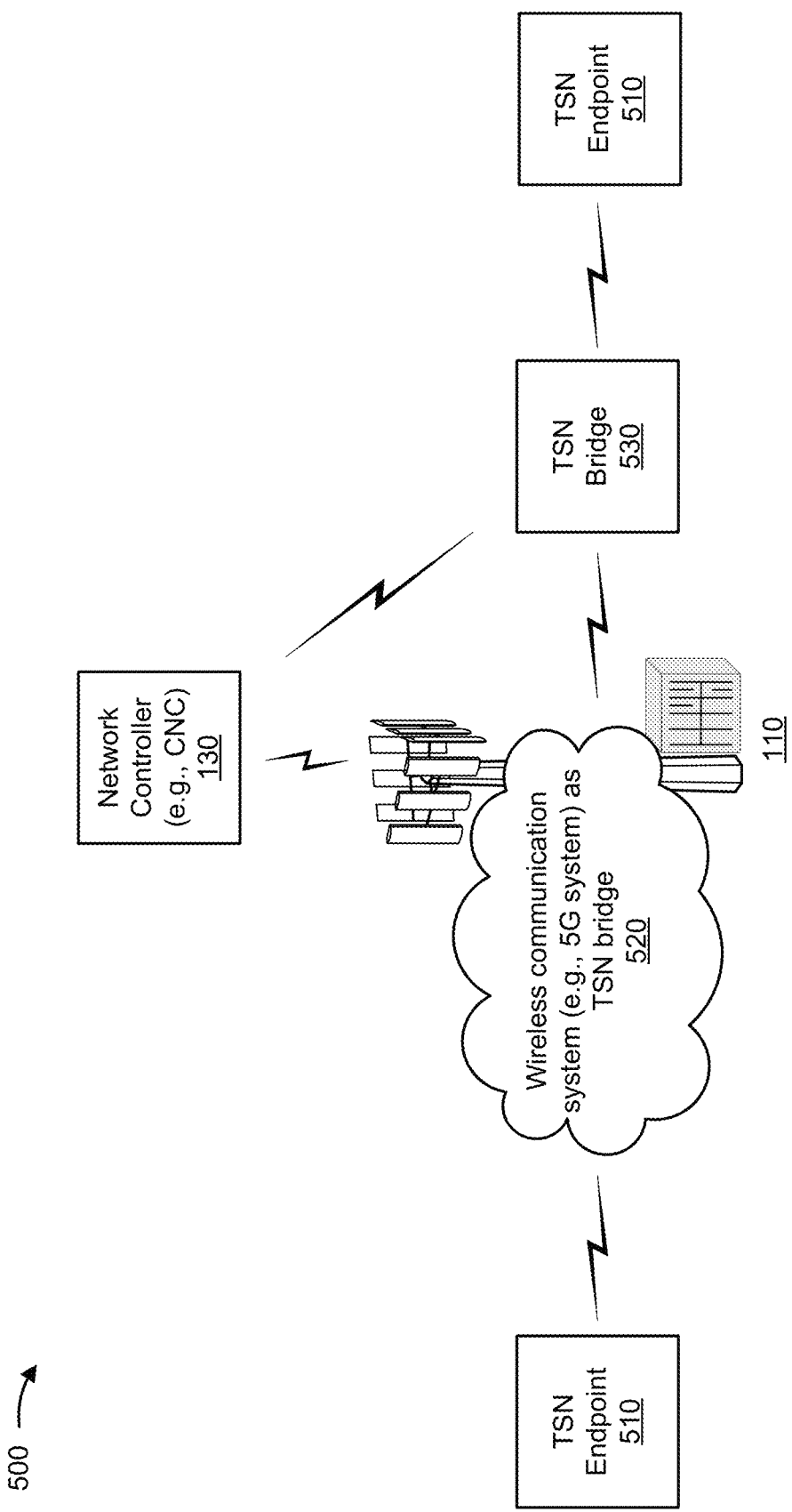
FIG. 5 is a diagram illustrating an example of a network architecture for transmission of time-sensitive network traffic via a wireless communication system, in accordance with various aspects of the present disclosure.

FIG. 5 is a diagram illustrating an example 500 of a network architecture for transmission of time-sensitive network traffic via a wireless communication system, in accordance with various aspects of the present disclosure.

Time-sensitive network (TSN) traffic is a traffic type associated with low latency and high reliability, and is defined by a set of Ethernet communication standards (e.g., as part of the Institute of Electrical and Electronics Engineers (IEEE) 802.1). The standards define mechanisms for synchronized, time-sensitive transmission of data over wired Ethernet networks, including a variety of parameters that can be configured to meet various latency requirements, reliability requirements, jitter requirements, and/or the like. In some scenarios, transmission of TSN traffic via a wireless communication system, such as a New Radio (e.g., 5G) wireless communication system, may require strict latency and/or reliability requirements in a wireless communication scenario, such as provided by ultra-reliability low latency communication (URLLC) services, for industrial Internet of Things (IIoT) traffic, factory automation traffic, and/or like use cases. Some techniques and apparatuses described herein assist with translating TSN traffic parameters to traffic parameters capable of being used in a wireless communication system, such as a 5G system, thereby permitting TSN traffic to be carried via a wireless communication system while satisfying stringent communication requirements.

As shown in FIG. 5, TSN endpoints 510 may communication with one another via a wireless communication system 520 and/or a TSN bridge 530. In some aspects, the wireless communication system 520 may act as a TSN bridge 530. The wireless communication system 520 may include a network controller 130, which may receive TSN configuration information from a centralized network configuration (CNC) device in a wired TSN. In some aspects, a TSN endpoint 510 may include a UE 120.

As an example, a first TSN endpoint 510 may include a device configured as a transmitter (e.g., referred to as a "talker" in TSN), and a second TSN endpoint 510 may include a device configured as a receiver (e.g., referred to as a "listener" in TSN). In some aspects, the talker may include a programmable logic controller (PLC) and/or the like. Additionally, or alternatively, the listener may include a sensor, an actuator, and/or the like (e.g., a robotic arm, a manufacturing device, an industrial robot, and/or the like). The talker may transmit TSN traffic to the listener using a TSN protocol (e.g., according to one or more TSN communication standards). The TSN traffic may be assigned to a traffic class (e.g., one of eight Ethernet traffic classes corresponding to different priorities).

A wired TSN bridge 530 may process the TSN traffic according to the traffic class and a TSN traffic configuration, as described in more detail below in connection with FIG. 6. The TSN traffic configuration may be received from a CNC device in a wired TSN. Because the TSN traffic configuration is associated with a wired communication standard (e.g., Ethernet), the parameters used to process TSN traffic, handle admission control (e.g., with certain guarantees or requirements, such as a maximum latency and/or the like), perform traffic scheduling (e.g., scheduling of data transmission), and/or the like may be specific to a wired communication standard, and those parameters may be different from those used in the wireless communication system 520. When a wireless communication system 520 processes and/or carries TSN traffic, various wireless protocols, wireless communication standards, and/or the like may be employed. Some techniques and apparatuses described herein assist with translating a TSN traffic configuration, intended for use in a wired communication system, to parameters that are capable of being used in a wireless communication system 520 (e.g., a flow bit rate, a maximum data burst volume, and/or the like). In this way, requirements associated with TSN traffic may be used for admission control, scheduling, and/or the like in a wireless communication system 520.

In some aspects, the network controller 130 may perform some techniques described herein to assist with such translation of TSN traffic configuration to parameters capable of being used in a wireless communication system 520, such as a 5G system. The network controller 130 may include, for example, one or more devices and/or functions of a core network of the wireless communication system 520. For example, the network controller 130 may include an access and mobility function (AMF), a session management function (SMF), a user plane function (UPF), a policy control function (PCF), and/or the like. Additionally, or alternatively, the network controller 130 may be a separate entity in a core network (e.g., an adapter function connecting a wired TSN network to wireless communication system 520) or may be part of an SMF, a PCF, an AMF, a UPF, and/or the like. As described in more detail below, the network controller 130 may transmit one or more parameters, associated with handling of TSN traffic, to a base station 110 (e.g., which may act as a TSN bridge 530). The base station 110 may apply those parameter(s) to perform operations associated with handling TSN traffic, such as admission control, scheduling, and/or the like.

As indicated above, FIG. 5 is provided as an example. Other examples are possible and may differ from what was described with respect to FIG. 5. For example, in some aspects, the network architecture may not include a wired TSN bridge 530.

Figure 6:
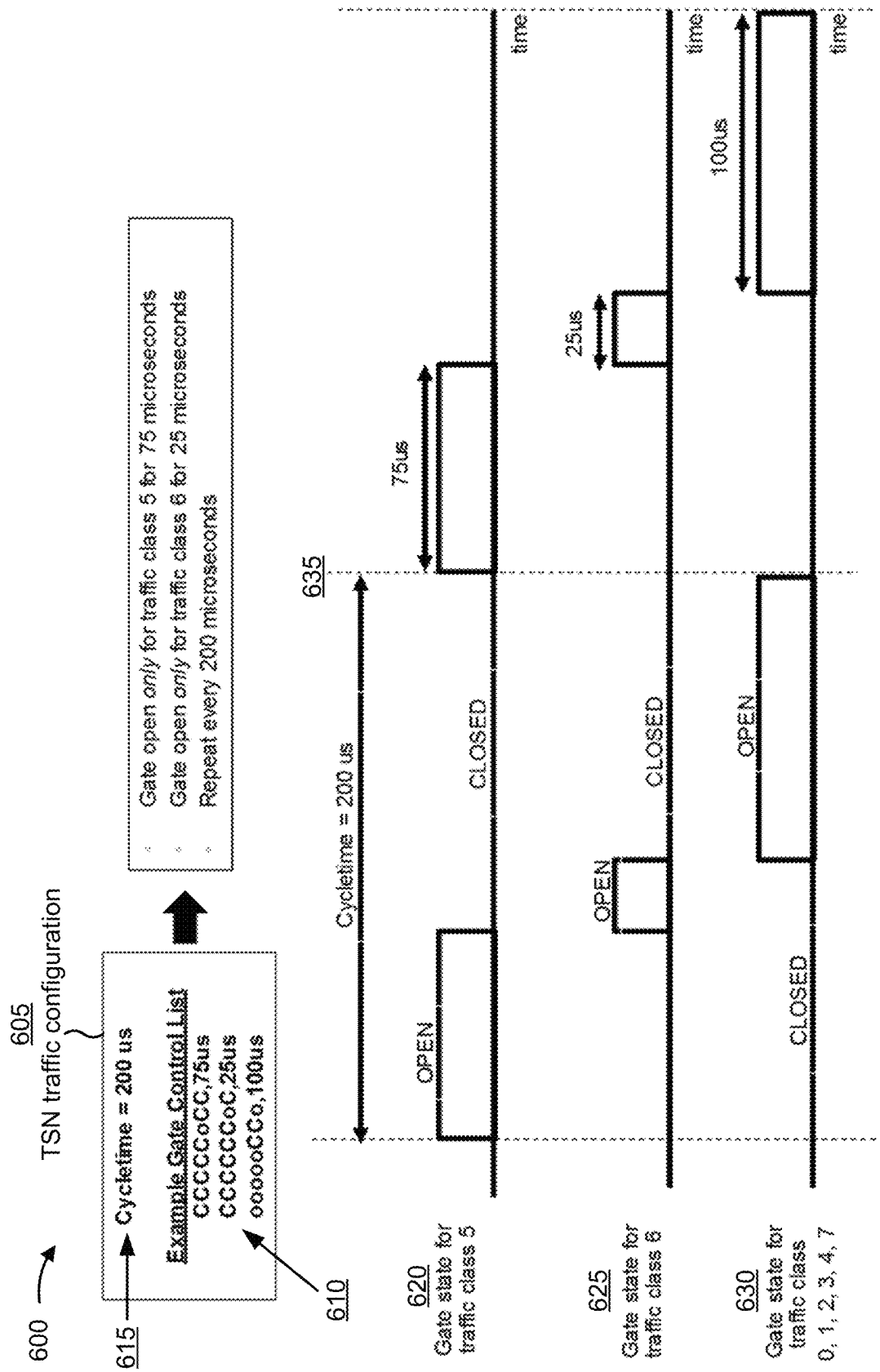
FIG. 6 is a diagram illustrating an example time-sensitive network traffic configuration, in accordance with various aspects of the present disclosure.

FIG. 6 is a diagram illustrating an example 600 of a time-sensitive network traffic configuration, in accordance with various aspects of the present disclosure.

As shown by reference number 605, a TSN traffic configuration may indicate parameters associated with one or more TSN traffic classes (e.g., one of eight possible Ethernet classes), where different TSN traffic classes may be handled with different priorities. As shown by reference number 610, the TSN traffic configuration may indicate a duration of time that a traffic class is associated with a gate open state, shown as being indicated in a gate control list. A TSN bridge 530 (or a device acting as a TSN bridge 530, such as base station 110 and/or the like) may schedule and/or transmit TSN traffic of that traffic class during a time period in which that traffic class is associated with the gate open state. In some aspects, the TSN traffic configuration may indicate durations of a gate open state for multiple TSN traffic classes. Additionally, or alternatively, as shown by reference number 615, the TSN traffic configuration may indicate a periodicity with which such gate open states occur (e.g., shown as a cycle time).

In example 600, the TSN traffic configuration indicates a gate open state with a duration of 75 microseconds (us) for traffic class 5, followed by a gate open state with a duration of 25 microseconds for traffic class 6, followed by a gate open state with a duration of 100 microseconds for all other traffic classes (e.g., traffic classes 0, 1, 2, 3, 4, and 7). The gate open state for traffic class 5 is indicated by 'o' in CCCCCoCC (or, e.g., 00000100 or 11111011), where each bit corresponds to a traffic class, and a value of the bit (e.g., 0 or 1) indicates whether the gate is open or closed for that traffic class, and a corresponding duration of 75 microseconds. Similarly, the gate open state for traffic class 6 is indicated by 'o' in CCCCCCoC with a corresponding duration of 75 microseconds, and the gate open state for the remaining traffic classes is indicated by 'o' entries of ooooooCCo with a corresponding duration of 100 microseconds. The periodicity of the gate open states is 200 microseconds, indicating that a specific state is triggered every 200 microseconds, which is also equal to the sum of the durations of each gate open state (e.g., 25+75+100=200).

As shown by reference number 620, using this example TSN traffic configuration, a first gating period begins with a first time period where TSN traffic class 5 is associated with a gate open state, which lasts for 75 microseconds. During the first time period, a TSN bridge 530 and/or a base station 110 may transmit only TSN traffic of traffic class 5, and may not transmit any other TSN traffic classes (e.g., since the gate control list indicates that all other traffic classes, other than traffic class 5, are associated with a gate closed state during the first time period). Accordingly, the TSN bridge 530 and/or the base station 110 may schedule only TSN traffic of traffic class 5 for transmission in the first time period.

As shown by reference number 625, after the first time period expires (e.g., after 75 microseconds), a second time period occurs where TSN traffic class 6 is associated with a gate open state, which lasts for 25 microseconds. During the second time period, a TSN bridge 530 and/or a base station 110 may transmit only TSN traffic of traffic class 6, and may not transmit any other TSN traffic classes (e.g., since the gate control list indicates that all other traffic classes, other than traffic class 6, are associated with a gate closed state during the second time period). Accordingly, the TSN bridge 530 and/or the base station 110 may schedule only TSN traffic of traffic class 6 for transmission in the second time period.

As shown by reference number 630, after the second time period expires (e.g., after 25 microseconds), a third time period occurs where TSN traffic classes 0, 1, 2, 3, 4, and 7 are associated with a gate open state, which lasts for 100 microseconds. During the third time period, a TSN bridge 530 and/or a base station 110 may transmit only TSN traffic having one of these traffic classes, and may not transmit any other TSN traffic classes (e.g., class 5 or class 6). Accordingly, the TSN bridge 530 and/or the base station 110 may schedule only TSN traffic of traffic classes 0, 1, 2, 3, 4, or 7 for transmission in the third time period.

As shown by reference number 635, after the third time period expires, a second gating period begins. The second gating period includes time periods corresponding to the first time period, the second time period, and the third time period described above. Thus, a first gate open period for traffic class 5, a second gate open period for traffic class 6, and a third gate open period for the remaining traffic classes each re-occur with a periodicity indicated by the TSN traffic configuration (e.g., 200 microseconds in example 600).

As indicated above, FIG. 6 is provided as an example. Other examples are possible and may differ from what was described with respect to FIG. 6. For example, the number of time periods in a gating period, the duration of the time periods, the traffic classes associated with a gate open period during the time periods, the periodicity, and/or the like may differ from what was described above in connection with FIG. 6.

Figure 7:
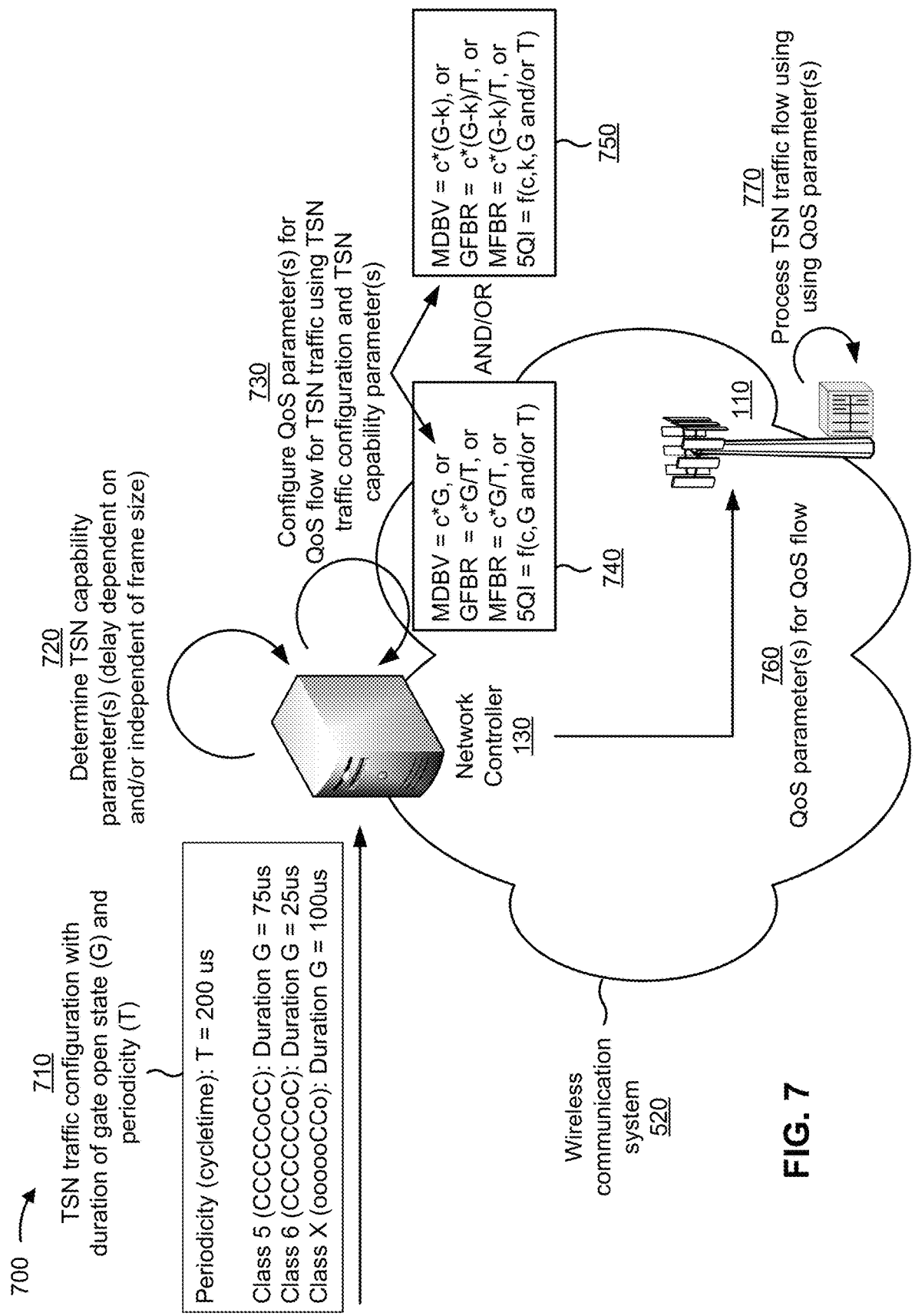
FIG. 7 is a diagram illustrating an example of quality of service mapping for time-sensitive network traffic in a wireless communication system, in accordance with various aspects of the present disclosure.

FIG. 7 is a diagram illustrating an example 700 of quality of service mapping for time-sensitive network traffic in a wireless communication system, in accordance with various aspects of the present disclosure.

As shown by reference number 710, a network controller 130, associated with a wireless communication system 520 (e.g., a 5G or New Radio wireless communication system) may receive a TSN traffic configuration (also referred to as an IEEE 802.1Qbv configuration and/or the like). In some aspects, the network controller 130 may receive the TSN traffic configuration from a device associated with a TSN, such as a TSN endpoint 510, a TSN bridge 530, a CNC, a device that receives user input to configure the TSN, and/or the like. Additionally, or alternatively, the network controller 130 may generate the TSN traffic configuration based at least in part on one or more requirements associated with the TSN, TSN endpoints 510, TSN traffic to be carried via the TSN, and/or the like. In some aspects, the network controller 130 may determine and/or receive the TSN traffic configuration in association with establishing a TSN traffic flow for communication between TSN endpoints 510. In some aspects, the network controller 130 may be collocated with another network device. For example, network controller 130 may be collocated with base station 110 or with a TSN configuration entity, such as a CNC. In this case, the network controller 130 and the base station 110 may communicate with one another by providing information to one another.

As described above in connection with FIG. 6, the TSN traffic configuration may indicate a duration of a gate open state (shown as "G", and which may also be referred to as a gate state octet) for a TSN traffic flow (e.g., having a specific traffic class) and a periodicity with which the gate open state occurs (shown as "T", and which may also be referred to as a time interval). In some aspects, the TSN traffic configuration may indicate multiple durations corresponding to multiple gate open states for different combinations of TSN traffic flows. For example, the TSN traffic configuration may indicate a gate open state with a duration of 75 microseconds for traffic class 5, followed by a gate open state with a duration of 25 microseconds for traffic class 6, followed by a gate open state with a duration of 100 microseconds for all other traffic classes (e.g., traffic classes 0, 1, 2, 3, 4, and 7), as described above in connection with FIG. 6.

As shown by reference number 720, the network controller 130 may determine one or more TSN capability parameters associated with the network controller 130. A TSN capability parameter may indicate a capability, associated with the network controller 130 and/or a wireless communication system 520 (e.g., one or more devices included in the wireless communication system 520) in which the network controller 130 operates, relating to transmission of TSN traffic. In some aspects, a TSN capability parameter may depend on one or more capabilities of the wireless communication system. For example, different wireless communications systems using the network controller 130 may have different TSN capability parameters depending on various parameters, such as supported subcarrier spacings, bandwidth, quality of backhauls, and/or the like.

In some aspects, a TSN capability parameter may relate to a delay associated with transmission of TSN traffic. For example, a TSN capability parameter may relate to a delay associated with transmission of TSN traffic via a wireless communication system 520 in which the network controller 130 operates, such as a minimum delay for a frame (e.g., a packet, an Ethernet frame, an encapsulated Ethernet frame, and/or the like) to traverse the wireless communication system 520 (e.g., between TSN endpoints 510), a maximum delay for a frame to traverse the wireless communication system 520, and/or the like.

In some aspects, a TSN capability parameter may include a frame-dependent TSN capability parameter, which may depend on a size of a frame (e.g., a frame size, a packet size, and/or the like). For example, a frame-dependent TSN capability parameter may include a maximum dependent delay parameter (e.g., a maximum delay for a frame to traverse the wireless communication system 520 depending on a size of the frame, which may also be referred to as a dependentDelayMax parameter), a minimum dependent delay parameter (e.g., a minimum delay for a frame to traverse the wireless communication system 520 depending on a size of the frame, which may also be referred to as a dependentDelayMin parameter), a port transmit rate parameter (e.g., a rate at which one or more ports of one or more devices of the wireless communication system 520 are capable of transmitting frames, depending on size of the frames, which may also be referred to as a portTransmitRate parameter), and/or the like.

Additionally, or alternatively, a TSN capability parameter may include a frame-independent TSN capability parameter, which may not depend on a size of a frame. For example, a frame-independent TSN capability parameter may include a maximum independent delay parameter (e.g., a maximum delay for a frame to traverse the wireless communication system 520 independent of a size of the frame, which may also be referred to as an independentDelayMax parameter), a minimum independent delay parameter (e.g., a minimum delay for a frame to traverse the wireless communication system 520 independent of a size of the frame, which may also be referred to as an independentDelayMin parameter), a transmission propagation delay parameter (e.g., a propagation delay associated with transmitting a frame, such as via an over-the-air transmission, independent of a size of the frame, which may also be referred to as a txPropagationDelay parameter), and/or the like.

As shown by reference number 730, the network controller 130 may configure one or more quality of service (QoS) parameters, associated with the wireless communication system 520, for a QoS flow that is to carry the TSN traffic flow (e.g., that is to carry TSN traffic having a specific traffic class). The network controller 130 may configure a QoS parameter for a QoS flow based at least in part on a TSN capability parameter (e.g., described above), a duration of a gate open state associated with a TSN traffic flow to be carried via the QoS flow, and/or the periodicity indicated by the TSN traffic configuration. As shown, a QoS parameter may include a maximum data burst volume (MDBV) parameter, a guaranteed flow bit rate (GFBR) parameter, a maximum flow bit rate (MFBR) parameter, a 5G QoS indicator (5QI) parameter, and/or the like. In some aspects, parameters determined by the network controller 130 may assist with configuration and/or transmission of a TSN traffic flow, and thus may be referred to as time-sensitive communication assistance information (TSCAI). Examples of TSCAI can be found with reference to 3GPP Technical Specification (TS) 23.501 (such as in section 5.27.2 and 5.27.3 of version 16.2.0).

As shown by reference number 740, in some aspects, the network controller 130 may configure a QoS parameter for a QoS flow for carrying a TSN traffic flow based at least in part on a frame-dependent TSN capability parameter (shown as "c") and at least one of a duration of a gate open state for the TSN traffic flow (shown as "G") or the periodicity (shown as "T"). For example, the MDBV parameter may be configured based at least in part on the frame-dependent TSN capability parameter and the duration (e.g., as MDBV=c×G). Additionally, or alternatively, the GFBR parameter may be configured based at least in part on the frame-dependent TSN capability parameter, the duration, and the periodicity (e.g., as GFBR=c×G/T). Additionally, or alternatively, the MFBR parameter may be configured based at least in part on the frame-dependent TSN capability parameter, the duration, and the periodicity (e.g., as MFBR=c×G/T). In some aspects, "c" may be set equal to a value of 1/dependentDelayMax, a value of 1/dependentDelayMin, a value of portTransmitRate, and/or the like. In some aspects, the MDBV parameter, the GFBR parameter, and/or the MFBR parameter may be based at least in part on TSCAI. The TSCAI may be determined based at least in part on a duration of the gate open state, one or more TSN capability parameters, and/or a periodicity, in a similar manner as described above.

Additionally, or alternatively, the 5QI parameter may be configured based at least in part on the frame-dependent TSN capability parameter, the duration, and/or the periodicity. For example, the 5QI parameter may be configured as a function of the frame-dependent TSN capability parameter and at least one of the duration or the periodicity (e.g., shown as 5QI=f(c, G and/or T)). In some aspects, the 5QI parameter may be determined by calculating one or more other QoS parameters (e.g., MDBV, GFBR, MFBR, and/or the like) and determining a standardized or pre-specified 5QI parameter that has corresponding QoS parameter(s) that are closest to the calculated QoS parameter(s) (e.g., closest in value, closest to and greater than in value, closest to and less than in value, and/or the like). In this way, the calculated QoS parameters may be mapped to a corresponding 5QI parameter that permits the QoS parameters to be satisfied. In some aspects, the 5QI parameter may be determined based at least in part on TSCAI.

As shown by reference number 750, in some aspects, the network controller 130 may configure a QoS parameter for a QoS flow for carrying a TSN traffic flow based at least in part on a frame-dependent TSN capability parameter (shown as "c"), a frame-independent TSN capability parameter (shown as "k"), and at least one of a duration of a gate open state for the TSN traffic flow (shown as "G") or the periodicity (shown as "T"). For example, the MDBV parameter may be configured based at least in part on the frame-dependent TSN capability parameter, the frame-independent TSN capability parameter, and the duration (e.g., as MDBV=c×(G−k)). Additionally, or alternatively, the GFBR parameter may be configured based at least in part on the frame-dependent TSN capability parameter, the frame-independent TSN capability parameter, the duration, and the periodicity (e.g., as GFBR=c×(G−k)/T). Additionally, or alternatively, the MFBR parameter may be configured based at least in part on the frame-dependent TSN capability parameter, the frame-independent TSN capability parameter, the duration, and the periodicity (e.g., as MFBR=c×(G−k)/T). In some aspects, "k" may be set equal to a value of independentDelayMax, a value of independentDelayMin, a value of txPropagationDelay, and/or the like. In some aspects, the MDBV parameter, the GFBR parameter, and/or the MFBR parameter may be determined based at least in part on TSCAI. The TSCAI may be determined based at least in part on a duration of the gate open state, one or more TSN capability parameters, and/or a periodicity, in a similar manner as described above.

Additionally, or alternatively, the 5QI parameter may be configured based at least in part on the frame-dependent TSN capability parameter, the frame-independent TSN capability parameter, the duration, and/or the periodicity. For example, the 5QI parameter may be configured as function of the frame-dependent TSN capability parameter, the frame-independent TSN capability parameter, and at least one of the duration or the periodicity (e.g., shown as 5QI=f(c, k, G and/or T)). In some aspects, the 5QI parameter may be determined by calculating one or more other QoS parameters (e.g., MDBV, GFBR, MFBR, and/or the like) and determining a standardized or pre-specified 5QI parameter that has corresponding QoS parameter(s) that are closest to the calculated QoS parameter(s) (e.g., closest in value, closest to and greater than in value, closest to and less than in value, and/or the like). In this way, the calculated QoS parameters may be mapped to a corresponding 5QI parameter that permits the QoS parameters to be satisfied. In some aspects, the 5QI parameter may be determined based at least in part on TSCAI.

As shown by reference number 750, in some aspects, the network controller 130 may configure a QoS parameter for a QoS flow for carrying a TSN traffic flow based at least in part on a frame-dependent TSN capability parameter (shown as "c"), a frame-independent TSN capability parameter (shown as "k") and at least one of a duration of a gate open state for the TSN traffic flow (shown as "G") or the periodicity (shown as "T").

As shown by reference number 760, the network controller 130 may transmit the one or more QoS parameters for a QoS traffic flow to a base station 110 associated with the wireless communication system 520, such as a base station 110 with a coverage area that includes one or more TSN endpoints 510 communicating using the TSN traffic. In some aspects, the network controller 130 may transmit the one or more QoS parameters to the base station 110 prior to the establishment of a QoS flow to carry the TSN traffic. Additionally, or alternatively, the base station 110 and/or the network controller 130 may use the QoS parameters to perform admission control for the TSN traffic. In some aspects, the network controller 130 may be collocated with another network device. For example, network controller 130 may be collocated with base station 110 or with a TSN configuration entity, such as a CNC. In this case, the network controller 130 and the base station 110 may communicate with one another by providing information to one another.

For example, the base station 110 and/or the network controller 130 may determine whether the QoS parameters are capable of being satisfied (e.g., based at least in part on a traffic load, a number of UEs 120 and/or TSN endpoints 510, network conditions, and/or the like associated with the base station 110, the wireless communication system 520, and/or the like). If the QoS parameters are capable of being satisfied, then the base station 110 and/or the network controller 130 may establish a QoS flow (and/or a radio bearer) to carry the TSN traffic according to the QoS parameter(s). If the QoS parameters are not capable of being satisfied, then the base station 110 and/or the network controller 130 may not establish a QoS flow (and/or a radio bearer) to carry the TSN traffic according to the QoS parameter(s). In this way, quality of service for TSN traffic may be guaranteed when that TSN traffic is carried over a wireless communication system 520, such as a 5G network and/or the like.

As shown by reference number 770, the base station 110 may process the TSN traffic flow based at least in part on the one or more QoS parameters. For example, the base station 110 may use the one or more QoS parameters to perform admission control in association with the TSN traffic flow, as described above. Additionally, or alternatively, the base station 110 may schedule transmission of TSN traffic, of the TSN traffic flow, via the QoS flow based at least in part on the one or more QoS parameters. For example, the base station 110 may schedule (and/or transmit) TSN traffic such that the QoS parameters are satisfied. In this way, quality of service for TSN traffic may be guaranteed when that TSN traffic is carried over a wireless communication system 520, such as a 5G network and/or the like. Furthermore, aspects of the wireless communication system 520 may be improved, such as reliability of the wireless communication system 520 (e.g., by permitting latency and/or reliability requirements to be guaranteed), flexibility of the wireless communication system 520 (e.g., by permitting TSN traffic to be carried), efficiency of the wireless communication system 520 (e.g., due to standardized translation of a TSN traffic configuration to QoS parameters), and/or the like.

As indicated above, FIG. 7 is provided as an example. Other examples are possible and may differ from what was described with respect to FIG. 7.

Figure 8:
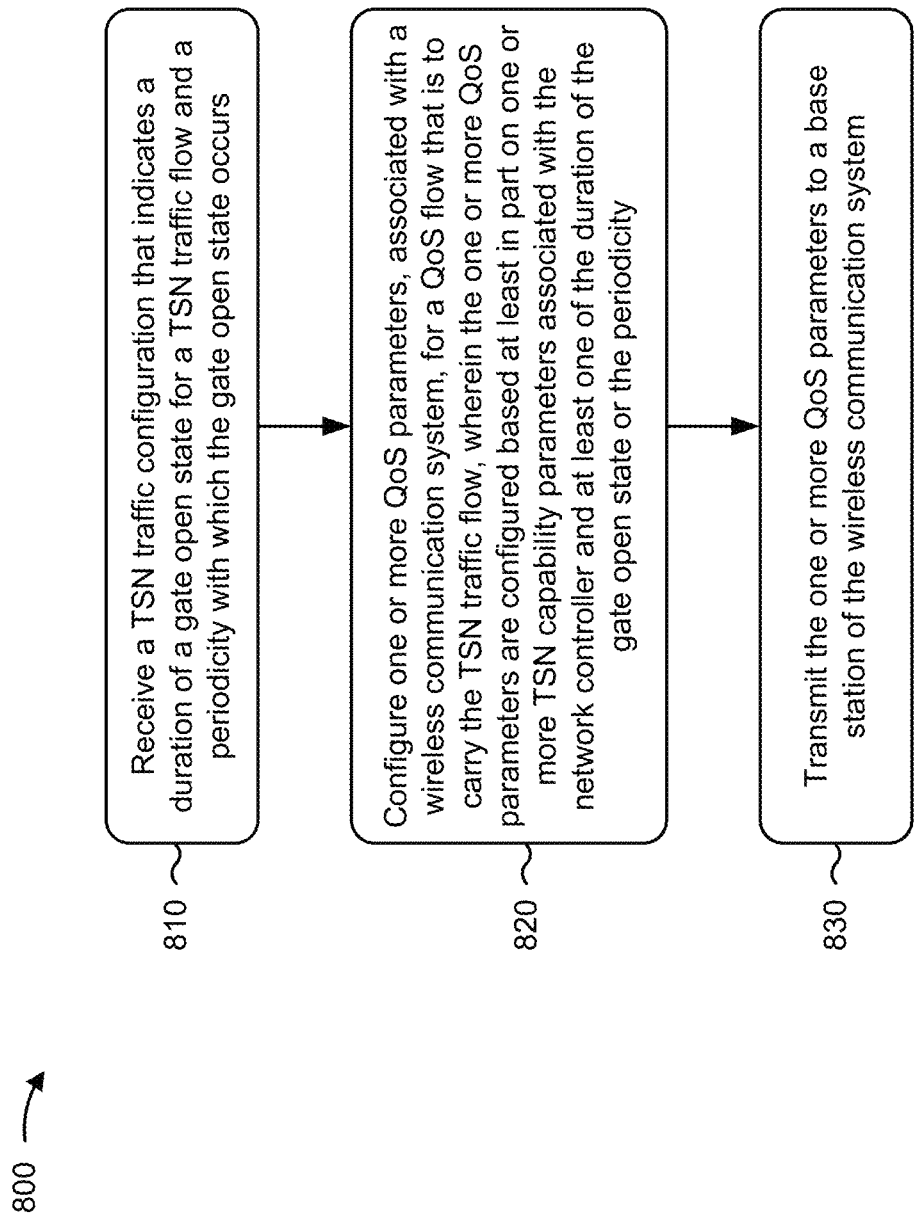
FIGS. 8-9 are diagrams illustrating example processes relating to quality of service mapping for time-sensitive network traffic in a wireless communication system, in accordance with various aspects of the present disclosure.

FIG. 8 is a diagram illustrating an example process 800 performed, for example, by a network controller, in accordance with various aspects of the present disclosure. Example process 800 is an example where a network controller (e.g., network controller 130 and/or the like) performs operations associated with quality of service mapping for time-sensitive network traffic in a wireless communication system.

As shown in FIG. 8, in some aspects, process 800 may include receiving a time-sensitive network (TSN) traffic configuration that indicates a duration of a gate open state for a TSN traffic flow and a periodicity with which the gate open state occurs (block 810). For example, the network controller (e.g., using controller/processor 290, memory 292, communication unit 294, and/or the like) may receive a TSN traffic configuration that indicates a duration of a gate open state for a TSN traffic flow and a periodicity with which the gate open state occurs, as described above.

As shown in FIG. 8, in some aspects, process 800 may include configuring one or more quality of service (QoS) parameters, associated with a wireless communication system, for a QoS flow that is to carry the TSN traffic flow, wherein the one or more QoS parameters are configured based at least in part on one or more TSN capability parameters associated with the network controller and at least one of the duration of the gate open state or the periodicity (block 820). For example, the network controller (e.g., using controller/processor 290, memory 292, communication unit 294, and/or the like) may configure one or more QoS parameters, associated with a wireless communication system associated with the network controller, for a QoS flow that is to carry the TSN traffic flow, as described above. In some aspects, the one or more QoS parameters are configured based at least in part on one or more TSN capability parameters associated with the network controller and at least one of the duration of the gate open state or the periodicity.

As shown in FIG. 8, in some aspects, process 800 may include transmitting the one or more QoS parameters to a base station of the wireless communication system (block 830). For example, the network controller (e.g., using controller/processor 290, memory 292, communication unit 294, and/or the like) may transmit the one or more QoS parameters to a base station of the wireless communication system, as described above.

Process 800 may include additional aspects, such as any single aspect or any combination of aspects described below and/or in connection with one or more other processes described elsewhere herein.

In a first aspect, the one or more QoS parameters are used for admission control or scheduling of the QoS flow.

In a second aspect, alone or in combination with the first aspect, the one or more QoS parameters include at least one of: a maximum data burst volume (MDBV) parameter, a guaranteed flow bit rate (GFBR) parameter, a maximum flow bit rate (MFBR) parameter, a 5G QoS indicator (5QI) parameter, or a combination thereof.

In a third aspect, alone or in combination with one or more of the first and second aspects, the MDBV parameter is configured based at least in part on at least one of the duration of the gate open state or the one or more TSN capability parameters.

In a fourth aspect, alone or in combination with one or more of the first through third aspects, the MDBV parameter is determined based at least in part on time-sensitive communication assistance information (TSCAI), and wherein the TSCAI is determined based at least in part on at least one of the duration of the gate open state or the one or more TSN capability parameters.

In a fifth aspect, alone or in combination with one or more of the first through fourth aspects, at least one of the GFBR parameter or the MFBR parameter is configured based at least in part on the duration of the gate open state, the periodicity, and the one or more TSN capability parameters.

In a sixth aspect, alone or in combination with one or more of the first through fifth aspects, the 5QI parameter is configured based at least in part on the duration of the gate open state, the periodicity, and the one or more TSN capability parameters.

In a seventh aspect, alone or in combination with one or more of the first through sixth aspects, the one or more TSN capability parameters include at least one of: a maximum dependent delay parameter, a minimum dependent delay parameter, a port transmit rate parameter, a maximum independent delay parameter, a minimum independent delay parameter, a transmission propagation delay parameter, or a combination thereof.

In an eighth aspect, alone or in combination with one or more of the first through seventh aspects, the one or more TSN capability parameters include a first TSN capability parameter relating to a dependent delay and a second TSN capability parameter relating to an independent delay.

In a ninth aspect, alone or in combination with one or more of the first through eighth aspects, the first TSN capability parameter includes at least one of: a maximum dependent delay parameter, a minimum dependent delay parameter, a port transmit rate parameter, or a combination thereof.

In a tenth aspect, alone or in combination with one or more of the first through ninth aspects, the second TSN capability parameter includes at least one of: a maximum independent delay parameter, a minimum independent delay parameter, a transmission propagation delay parameter, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
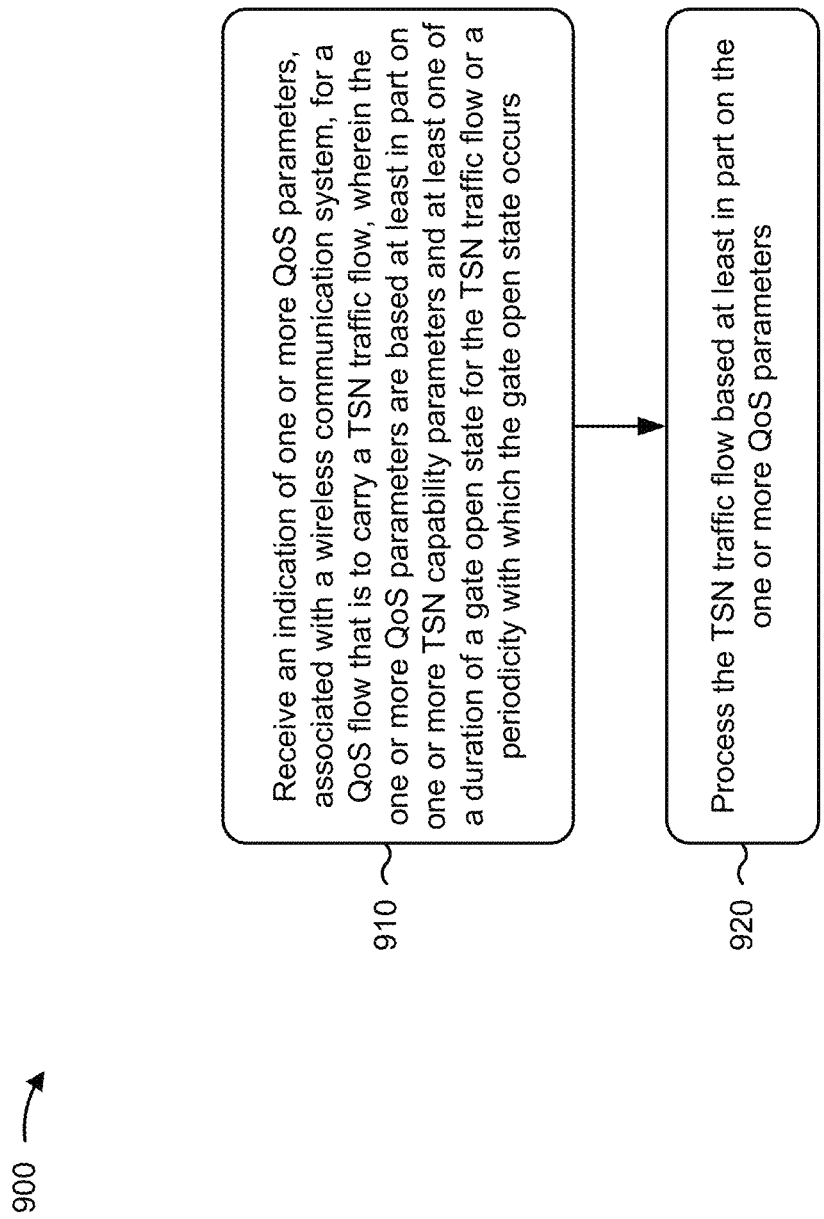

FIG. 9 is a diagram illustrating an example process 900 performed, for example, by a base station, in accordance with various aspects of the present disclosure. Example process 900 is an example where a base station (e.g., base station 110 and/or the like) performs operations associated with quality of service mapping for time-sensitive network traffic in a wireless communication system.

As shown in FIG. 9, in some aspects, process 900 may include receiving an indication of one or more quality of service (QoS) parameters, associated with a wireless communication system, for a QoS flow that is to carry a time-sensitive network (TSN) traffic flow, wherein the one or more QoS parameters are based at least in part on one or more TSN capability parameters and at least one of a duration of a gate open state for the TSN traffic flow or a periodicity with which the gate open state occurs (block 910). For example, the base station (e.g., using antenna 234, DEMOD 232, MIMO detector 236, receive processor 238, controller/processor 240, and/or the like) may receive an indication of one or more QoS parameters, associated with a wireless communication system of the base station, for a QoS flow that is to carry a TSN traffic flow, as described above. In some aspects, the one or more QoS parameters are based at least in part on one or more TSN capability parameters and at least one of a duration of a gate open state for the TSN traffic flow or a periodicity with which the gate open state occurs.

As shown in FIG. 9, in some aspects, process 900 may include processing the TSN traffic flow based at least in part on the one or more QoS parameters (block 920). For example, the base station (e.g., using controller/processor 240, transmit processor 220, TX MIMO processor 230, MOD 232, antenna 234, and/or the like) may process the TSN traffic flow based at least in part on the one or more QoS parameters, as described above.

Process 900 may include additional aspects, such as any single aspect or any combination of aspects described below and/or in connection with one or more other processes described elsewhere herein.

In a first aspect, processing the TSN traffic flow comprises at least one of: performing admission control in association with the TSN traffic flow, or scheduling transmission of TSN traffic, of the TSN traffic flow, via the QoS flow.

In a second aspect, alone or in combination with the first aspect, the one or more QoS parameters include at least one of: a maximum data burst volume (MDBV) parameter, a guaranteed flow bit rate (GFBR) parameter, a maximum flow bit rate (MFBR) parameter, a 5G QoS indicator (5QI) parameter, or a combination thereof.

In a third aspect, alone or in combination with one or more of the first and second aspects, the MDBV parameter is based at least in part on at least one of the duration of the gate open state or the one or more TSN capability parameters.

In a fourth aspect, alone or in combination with one or more of the first through third aspects, the MDBV parameter is based at least in part on time-sensitive communication assistance information (TSCAI), and wherein the TSCAI is based at least in part on at least one of the duration of the gate open state or the one or more TSN capability parameters.

In a fifth aspect, alone or in combination with one or more of the first through fourth aspects, at least one of the GFBR parameter or the MFBR parameter is based at least in part on the duration of the gate open state, the periodicity, and the one or more TSN capability parameters.

In a sixth aspect, alone or in combination with one or more of the first through fifth aspects, the 5QI parameter is based at least in part on the duration of the gate open state, the periodicity, and the one or more TSN capability parameters.

In a seventh aspect, alone or in combination with one or more of the first through sixth aspects, the one or more TSN capability parameters include at least one of: a maximum dependent delay parameter, a minimum dependent delay parameter, a port transmit rate parameter, a maximum independent delay parameter, a minimum independent delay parameter, a transmission propagation delay parameter, or a combination thereof.

In an eighth aspect, alone or in combination with one or more of the first through seventh aspects, the one or more TSN capability parameters include a first TSN capability parameter relating to dependent delay and a second TSN capability parameter relating to independent delay.

In a ninth aspect, alone or in combination with one or more of the first through eighth aspects, the first TSN capability parameter includes at least one of: a maximum dependent delay parameter, a minimum dependent delay parameter, a port transmit rate parameter, or a combination thereof.

In a tenth aspect, alone or in combination with one or more of the first through ninth aspects, the second TSN capability parameter includes at least one of: a maximum independent delay parameter, a minimum independent delay parameter, a transmission propagation delay parameter, or a combination thereof.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network controller of a wireless communication system, comprising:
   receiving a time-sensitive network (TSN) traffic configuration that indicates a duration of a gate open state for a TSN traffic flow and a periodicity with which the gate open state occurs;
   configuring one or more quality of service (QoS) parameters, associated with the wireless communication system, for a QoS flow that is to carry the TSN traffic flow, wherein the one or more QoS parameters are configured based at least in part on one or more TSN capability parameters associated with the network controller and at least one of the duration of the gate open state or the periodicity, and wherein the one or more QoS parameters include at least one of:
      a maximum data burst volume (MDBV) parameter,
      a guaranteed flow bit rate (GFBR) parameter, or
      a maximum flow bit rate (MFBR) parameter; and
   transmitting the one or more QoS parameters to a base station of the wireless communication system.

2. The method of claim 1, wherein the one or more QoS parameters are used for admission control or scheduling of the QoS flow.

3. The method of claim 1, wherein the one or more QoS parameters further include
   a 5G QoS indicator (5QI) parameter.

4. The method of claim 3, wherein the 5QI parameter is configured based at least in part on the duration of the gate open state, the periodicity, and the one or more TSN capability parameters.

5. The method of claim 1, wherein the MDBV parameter is configured based at least in part on at least one of the duration of the gate open state or the one or more TSN capability parameters.

6. The method of claim 1, wherein the MDBV parameter is determined based at least in part on time-sensitive communication assistance information (TSCAI), and wherein the TSCAI is determined based at least in part on at least one of the duration of the gate open state or the one or more TSN capability parameters.

7. The method of claim 1, wherein at least one of the GFBR parameter or the MFBR parameter is configured based at least in part on the duration of the gate open state, the periodicity, and the one or more TSN capability parameters.

8. The method of claim 1, wherein the one or more TSN capability parameters include at least one of:
   a maximum dependent delay parameter,
   a minimum dependent delay parameter,
   a port transmit rate parameter,
   a maximum independent delay parameter,
   a minimum independent delay parameter,
   a transmission propagation delay parameter, or
   a combination thereof.

9. The method of claim 1, wherein the one or more TSN capability parameters include a first TSN capability parameter relating to a dependent delay and a second TSN capability parameter relating to an independent delay.

10. The method of claim 9, wherein the first TSN capability parameter includes at least one of:
    a maximum dependent delay parameter,
    a minimum dependent delay parameter,
    a port transmit rate parameter, or
    a combination thereof.

11. The method of claim 9, wherein the second TSN capability parameter includes at least one of:
    a maximum independent delay parameter,
    a minimum independent delay parameter,
    a transmission propagation delay parameter, or
    a combination thereof.

12. A method of wireless communication performed by a base station of a wireless communication system, comprising:
    receiving an indication of one or more quality of service (QoS) parameters, associated with the wireless communication system, for a QoS flow that is to carry a time-sensitive network (TSN) traffic flow, wherein the one or more QoS parameters are based at least in part on one or more TSN capability parameters and at least one of a duration of a gate open state for the TSN traffic flow or a periodicity with which the gate open state occurs, and wherein the one or more QoS parameters include at least one of:
 a maximum data burst volume (MDBV) parameter,
 a guaranteed flow bit rate (GFBR) parameter, or
 a maximum flow bit rate (1VIFBR) parameter; and
processing the TSN traffic flow based at least in part on the one or more QoS parameters.

13. The method of claim 12, wherein processing the TSN traffic flow comprises at least one of:
 performing admission control in association with the TSN traffic flow, or
 scheduling transmission of TSN traffic, of the TSN traffic flow, via the QoS flow.

14. The method of claim 12, wherein the one or more QoS parameters further include
 a 5G QoS indicator (5QI) parameter.

15. The method of claim 14, wherein the 5QI parameter is based at least in part on the duration of the gate open state, the periodicity, and the one or more TSN capability parameters.

16. The method of claim 12, wherein the MDBV parameter is based at least in part on at least one of the duration of the gate open state or the one or more TSN capability parameters.

17. The method of claim 12, wherein the MDBV parameter is based at least in part on time-sensitive communication assistance information (TSCAI), and wherein the TSCAI is based at least in part on at least one of the duration of the gate open state or the one or more TSN capability parameters.

18. The method of claim 12, wherein at least one of the GFBR parameter or the MFBR parameter is based at least in part on the duration of the gate open state, the periodicity, and the one or more TSN capability parameters.

19. The method of claim 12, wherein the one or more TSN capability parameters include at least one of:
 a maximum dependent delay parameter,
 a minimum dependent delay parameter,
 a port transmit rate parameter,
 a maximum independent delay parameter,
 a minimum independent delay parameter,
 a transmission propagation delay parameter, or
 a combination thereof.

20. The method of claim 12, wherein the one or more TSN capability parameters include a first TSN capability parameter relating to dependent delay and a second TSN capability parameter relating to independent delay.

21. The method of claim 20, wherein the first TSN capability parameter includes at least one of:
 a maximum dependent delay parameter,
 a minimum dependent delay parameter,
 a port transmit rate parameter, or
 a combination thereof.

22. The method of claim 20, wherein the second TSN capability parameter includes at least one of:
 a maximum independent delay parameter,
 a minimum independent delay parameter,
 a transmission propagation delay parameter, or
 a combination thereof.

23. A network controller of a wireless communication system, comprising:
 a memory; and
 one or more processors coupled to the memory, the memory and the one or more processors configured to:
  determine a time-sensitive network (TSN) traffic configuration that indicates a duration of a gate open state for a TSN traffic flow and a periodicity with which the gate open state occurs;
  configure one or more quality of service (QoS) parameters, associated with the wireless communication system, for a QoS flow that is to carry the TSN traffic flow, wherein the one or more QoS parameters are configured based at least in part on one or more TSN capability parameters associated with the network controller and at least one of the duration of the gate open state or the periodicity, and wherein the one or more QoS parameters include at least one of:
   a maximum data burst volume (MDBV) parameter,
   a guaranteed flow bit rate (GFBR) parameter, or
   a maximum flow bit rate (MFBR) parameter; and
  transmit the one or more QoS parameters to a base station of the wireless communication system.

24. The network controller of claim 23, wherein the one or more QoS parameters further include
 a 5G QoS indicator (5QI) parameter.

25. The network controller of claim 23, wherein the MDBV parameter is configured based at least in part on at least one of the duration of the gate open state or the one or more TSN capability parameters.

26. The network controller of claim 23, wherein the MDBV parameter is determined based at least in part on time-sensitive communication assistance information (TSCAI), and wherein the TSCAI is determined based at least in part on at least one of the duration of the gate open state or the one or more TSN capability parameters.

27. A base station of a wireless communication system, comprising:
 a memory; and
 one or more processors coupled to the memory, the memory and the one or more processors configured to:
  receive an indication of one or more quality of service (QoS) parameters, associated with the wireless communication system, for a QoS flow that is to carry a time-sensitive network (TSN) traffic flow, wherein the one or more QoS parameters are configured based at least in part on one or more TSN capability parameters and at least one of a duration of a gate open state for the TSN traffic flow or a periodicity with which the gate open state occurs, and wherein the one or more QoS parameters include at least one of:
   a maximum data burst volume (MDBV) parameter,
   a guaranteed flow bit rate (GFBR) parameter, or
   a maximum flow bit rate (MFBR) parameter; and
  process the TSN traffic flow based at least in part on the one or more QoS parameters.

28. The base station of claim 27, wherein the one or more QoS parameters further include
 a 5G QoS indicator (5QI) parameter.

29. The base station of claim 27, wherein the MDBV parameter is based at least in part on at least one of the duration of the gate open state or the one or more TSN capability parameters.

30. The base station of claim 27, wherein the MDBV parameter is based at least in part on time-sensitive communication assistance information (TSCAI), and wherein the TSCAI is determined based at least in part on at least one of the duration of the gate open state or the one or more TSN capability parameters.

\* \* \* \* \*